July 19, 1966

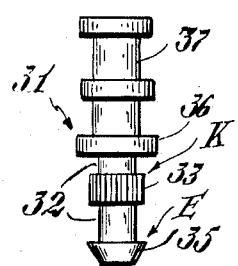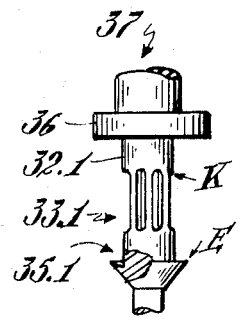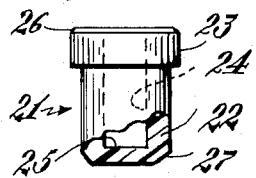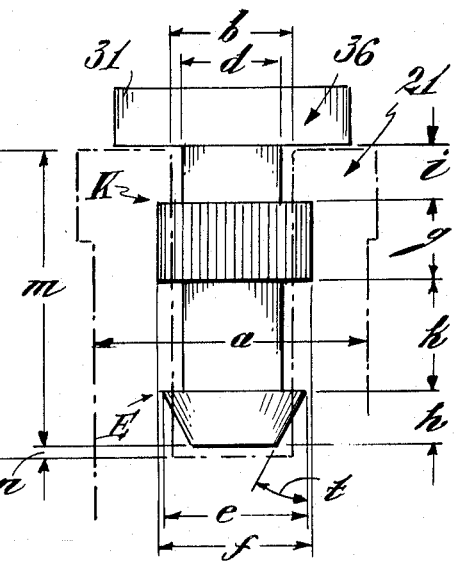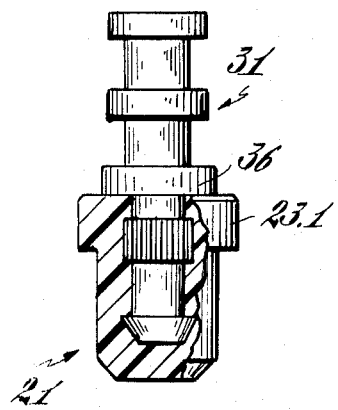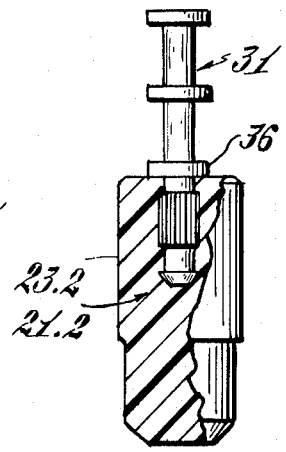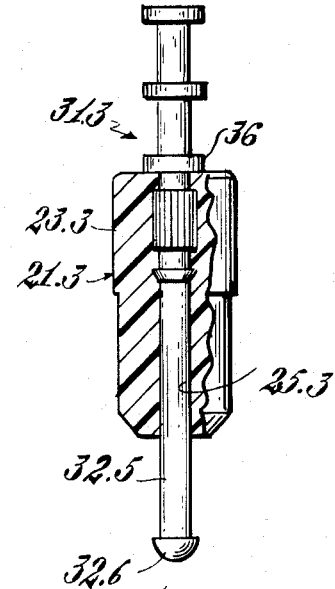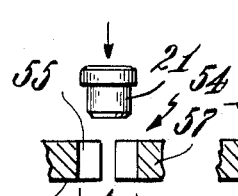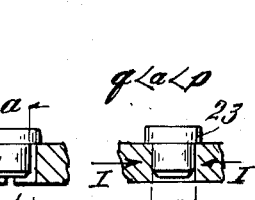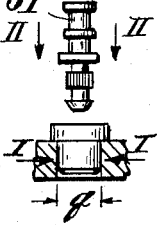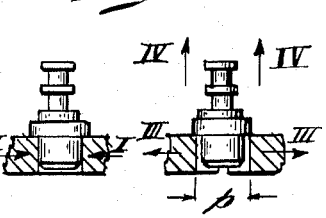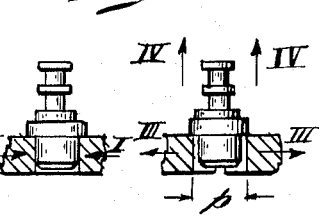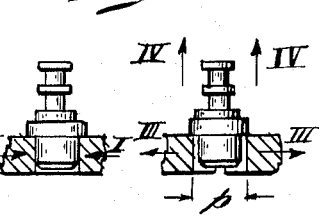

F. E. RUST ETAL 3,261,909

ELECTRICALLY INSULATING TERMINALS AND METHOD
OF FABRICATING THEM

Filed June 20, 1962

INVENTORS
Frank E. Rust
Raymond B. Demeritt
BY Roberts, Cushman & Grover
ATTYS.

United States Patent Office

3,261,909
ELECTRICALLY INSULATING TERMINALS AND METHOD OF FABRICATING THEM
Frank E. Rust, Waltham, and Raymond B. Demeritt, Braintree, Mass., assignors to Cambridge Thermionic Corporation, Cambridge, Mass., a corporation of Massachusetts
Filed June 20, 1962, Ser. No. 203,842
11 Claims. (Cl. 174—153)

The field of the present invention relates to the manufacture of composite articles such as insulating mounts for use in electrical installations involving dielectric bodies with conductive inserts.

Articles of the above type have heretofore been manufactured in various conventional ways which are satisfactory as applied to many conventional dielectric materials including synthetic resins of the more conventional type. Particularly desirable for dielectric components are, as well known, the fluorocarbon and to some extent chlorofluorocarbon polymer resins which are definitely superior to previously known dielectrics in many respects. They exhibit extreme inertness to chemical attack and have very high thermostability, low dielectric losses and high dielectric strength, dissipation factors and dielectric constants stable over frequencies from 60 cycles to 10,000 megacycles, and outstanding retention of these electrical properties over a wide temperature range. Also, while insulating bodies of such materials cannot be made by molding or sintering to the precise dimensions usually required for purposes of miniaturization, they can be machined with sufficient exactness for such purposes. On the other hand, these polymers do not, for practical purposes, adhere well to any material whatsoever, they also have the lowest friction of any solid, with the static friction coefficient being lower than the dynamic value, and they have peculiar elastic and non-elastic deformation properties. Also, properties such as stiffness, flex life, permeability and tensile properties are influenced by fabrication.

While fluorocarbon resins are thus very desirable for use as insulators, the commercially feasible, efficient and reasonably inexpensive manufacture of mechanically fully reliable composite articles, such as the above-mentioned mounts with metal inserts within an insulating body, has encountered considerable difficulty due to the above-mentioned and possibly other mechanical properties, and conventional experience as well as theoretical reasoning is of little avail for the practical solution of this difficulty. It was found that confinement of the insulating body during forceable insertion of a metallic insert which is slightly larger than a recess in the insulator produces satisfactory results, as set forth in Patent No. 2,918,521 to Ralph Abrams of December 22, 1959. Restraint of the insulator body to a desired final configuration during pressurable assembly with the rigid component is quite successful for many purposes, but this assembly technique does not necessarily lead to optimally firm and inseparable joining of insulating body and insert to meet al rigorous reuirements as to torque separation, axial pull out, and lateral pull out, as well as to an accurately predictable final shape of in the insulating body. This is evidently due to the above-mentioned peculiar elastic and non-elastic deformation properties and low friction and adhesion characteristics of the fluorocarbons. It has also been proposed in Patent No. 3,189,672 to Frank Lyman, Jr., to coin, or compress from the outside, fluorocarbon insulator bodies after the rigid insert has been pressed thereinto. This technique, while also satisfactory for certain purposes, is less satisfactory if extreme resistance against pulling of the insert from the insulator body is required.

Objects of the present invention are to improve present assembly techniques for the purpose of obtaining composite articles of the above type which are of superior quality with regard to the permanently firm joining of the insulating body and the rigid insert as well as with regard to the precisely predictable and permanently retained shape and dimension of the insulating body; to provide such composite bodies which are highly resistant against twisting, axial, and lateral pull out; to provide for the above purposes an optimally simple process which is to a large degree quite independent of the operator's skill; to provide for the above purposes dielectric and metallic components which can be easily prefabricated to dimensions and shapes which lend themselves particularly well for obtaining the object of resistance against pulling the insert from the insulator body and against relative rotation; and to provide an assembly technique which can be carried out by apparatus capable of being actuated by machinery which can be easily adopted or reconstructed from available components.

The nature and substance of the present invention can be shortly summarized in its principal aspects as follows.

A recessed insulator body of synthetic polymer material of the fluorocarbon type and a rigid conductive insert having on a stem a projecting tapered anchor portion and a projecting or recessed non-circular anti-rotation portion are preformed such that the stem portion is slightly larger, and the anchor portion considerably larger than the body recess. The anchor portion and the anti-rotation portion are provided with sharp edges on the side towards which the insert would be pulled during use; while the above preformed dimensional relations have been previously suggested, it was found that they are particularly effective in combination with the sharp edges which, so far as can be ascertained, are instrumental in preventing axial separation of body and insert. For probably similar reasons, finely subdivided and sharp non-circular portions were found to be particularly effective for preventing relative rotation of body and insert. Body and insert are assembled, further according to the invention, by compressing the body prior to assembly and by pressing the insert into the recess of the body while the latter is compressed. Optimal quality was obtained if the volume difference between preformed body recess and the insert portions therein confined is approximately zero—that is if the fluorocarbon material which is displaced by insert portions is about sufficient to fill insert portions which are narrower than corresponding preformed body recess dimensions.

The method according to the invention is thus particularly characterized by the above recited dimensional relations, and configurations of the preformed body and insert components and by the pressing of the insert into the compressed body. The article resulting from this method is characterized by the above described sharp edges of the insert, the contacting of the body material with essentially the entire contour of the insert, and the molecular arrangement of the fluorocarbon polymer of the body as caused by the latter's compression during the forceable assembly with the insert, as compared to that of the preformed body prior to assembly. The above outlined characteristics are preferably made use of in their entirety, but not necessarily so; for example, the sharp edges of the insert component are beneficial whether or not other characteristic features are incorporated exactly as described by way of a preferred embodiment, and the same is true of the particularly beneficial confinement of the body by compression during the pressurable insertion of the metal stem.

The description refers to drawings in which:

FIG. 1 is an elevation of a typical insert for purposes of the invention;

FIG. 2 is an elevation of an insulator body for purposes of the invention, prior to the insertion of the part according to FIG. 1;

FIG. 3 is an elevation similar to FIG. 1 of a rigid insert according to the invention, of different type;

FIG. 4 is a schematical diagram illustrating the dimensional and configurational relations of the prefabricated insert and insulator components such as exemplified by FIGS. 1 and 2;

FIG. 5 is an elevation and axial section of an article according to the invention, assembled from parts according to FIGS. 1 and 2 in accordance with the method according to the invention;

FIG. 6 is an elevation and axial section similar to FIG. 5, of another embodiment of the invention;

FIG. 7 is an elevation and axial section similar to FIG. 5, of a third embodiment of the invention;

FIGS. 8a to 8f are schematical elevations and cross sections of components according to FIGS. 1 to 7, and of a die, illustrating the method according to the invention;

Figure 9:
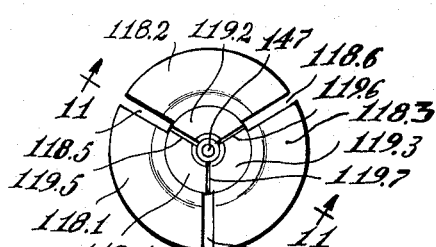
FIGS. 9 and 10 are top elevation and side elevation respectively of a die for carrying out the method according to FIGS. 8a to 8f.

The components of articles according to the invention will first be described with reference to FIGS. 1 to 4. These components consist of a dielectric insulator body 21 (FIG. 1) of fluorocarbon resin, and a rigid conductive insert pin 31 (FIG. 2) of suitable metal.

The insulator body 21 has a cylindrical body portion 22, a flange 23, and a cylindrical recess 24 having a bottom 25. The insulator body can be chamfered as indicated at 26 and 27. The outside diameter of the cylindrical portion 22, and especially the diameter of the recess 24 are to some extent critical and will be discussed with reference to FIG. 4. The body 21 is made of synthetic polymer material of the type for which the herein described technique is especially suited. Such material comprises certain polyethylene resins, especially polyfluoroethylene compounds which have peculiarly favorable electrical and to some extent mechanical properties. Polyethylene, polychlorotrifluoroethylene, and polytetrafluoroethylene resins are commercially available under the trademarks Alathon, KEL-F, and Teflon, respectively. As mentioned above, these materials exhibit properties which render them very desirable as dielectrics, but unsuitable for conventional assembly with metal or otherwise rigid components. For purposes of the present invention, virgin Teflon obtained in the shape of rods is preferably used, and this material can be fairly easily machined by conventional techniques to quite accurate dimensions not obtainable by pressing or sintering from the commercially available molding powder.

The metal insert 31 has a stem portion 32 upon which are superimposed constraining portions for preventing axial as well as rotatory movement of the insert within the insulating body, preferably a non-circular portion such as the knurled collar portion 33 and a tapered anchor portion 35. A seating flange 36 is suitable, although not essential, for determining the penetration of the insert into the insulator. Extending at the other side of the flange 36 are portions serving the electrical purposes of the device such as a soldering lug 37. It will be understood that the lug element can be of any desired shape such as for instance split or fork shaped, and that any suitable terminal structure or connecting means such as for example a connector jack or pin portion can be used instead of the lug 37. It should also be understood that the constraining portions such as 33 and 35 can have different shape so long as they serve the general function and purpose herein set forth. For example, instead of the knurled collar 33, different non-circular rotation preventing stem deformations can be used, for example fluted or grooved portions such as shown in FIG. 3 at 33.1 for stem 32.1. It will be understood that such grooves can be cut with conventional milling equipment making it possible to obtain sharp edges on the periphery of the stem, for the purpose to be explained hereinbelow.

As mentioned above, the relative preassembly dimensions of the insulating bodies and the conductive inserts are rather critical, and the same is true of the shape of the embedded portions of the insert. This aspect of the invention will now be described with reference to FIG. 4 which shows diagrammatically the outlines of an insert and of the cavity or recess of an insulating body prior to assembly. Components according to FIGS. 1 and 2 have been selected for this purpose and it will be noted that the inert according to FIG. 2 is outlined in full, and the body according to FIG. 1 in dot and dash lines.

The letters $a$, $b$ and $c$ denote the outside diameter, recess diameter, and recess depth, respectively, of the insulating body, $d$, $e$ and $f$ are the diameters of insert stem, anchor and knurl, respectively, $g$ and $h$ are the lengths of knurl and anchor, respectively, and $i$ and $k$ the lengths of the neck portions between the seating flange, the knurled part, and the anchor, respectively. It should be understood that not all the above dimensions are equally critical, but that the recess diameter $b$ and the insert dimensions $d$, $e$, $i$ and $h$ are of considerable importance in their relation to each other. Generally speaking, the diameter $d$ of the insert neck portions 32 should be slightly smaller than the diameter $b$ of the insulator recess 25, whereas the diameters of the knurled or otherwise non-circular portion 33 and of the anchor portion 35, namely $f$ and $e$, respectively, should be considerably larger than the recess diameter $b$. The insert neck length dimensions $i$ and $k$ should not be below minimum values which can be experimentally found for given requirements of strength, because the Teflon body tends to shear or deviate if its longitudinal section is too small at these regions. By way of a rule of thumb, at least the anchor neck portion $k$ should be appreciably longer than the anchor height $h$. The difference $n$ between preformed insert length $m$ and recess depth $c$ is not critical but has been found to provide some advantage with regard to complete uninterrupted contact between body and insert. The outside diameter $a$ of the insulator body 21 is not particularly critical with respect to permanently firm assembly of the parts, but is given for purposes of providing a relative measure of the compression of the insulator body in accordance with the present invention, as it will be described hereinbelow with reference to FIGS. 8a to 8f.

The shape of the insert is quite important. The taper of the anchor 35 as indicated at $t$ in FIG. 4 is preferably about 30°. The edge E formed by the taper of the anchor 35 as well as the edge K on the remote side of the non-circular, such as knurled portion 33 should be as sharp as they can be made by well maintained cutting tools and they should not be deteriorated by shop practices such as tumbling. The beneficial function of sharp edges at the above indicated regions can be enhanced by a "fish hook" effect obtained by undercutting the face of the anchor collar, as indicated at 35.1 of FIG. 3. It should however be understood that a flat anchor face is satisfactory for most purposes if the edge E is sufficiently sharp. This is important because many conventional automatic tools do not lend themselves easily to undercutting operations.

The knurl 33 or fluting 33.1 should be sharp and comparatively fine; an 80 teeth per inch straight knurl was found to be satisfactory in the herein described embodiments.

The preferred relations of the preferred dimensions of the two components can be roughly expressed in terms of volume, namely that the volume of the insert portions which will displace material of the insulating body should be approximately equal to the volume of recess portions available for that purpose; in other words the material of the body at its recess should approximately fill the spaces at and between the anchor portion and the noncircular portion of the stem, so that the insert of the finished article will be essentially wholly embedded in the dielectric body, without empty spaces.

A practical example will now be given with reference to an embodiment according to FIGS. 1 and 2 showing insulating body and insert which, when assembled, exhibit the configuration according to FIG. 5. The preassembled dimensions of the components 21 and 31 of this embodiment are as follows.

Insulating body: $a=0.094''$; $b=0.059''$; $c=0.120''$.
Right insert: $d=0.040''$; $e=0.057''$; $f=0.059''$; $g=0.042''$; $h=0.020''$; $i=0.015''$; $k=0.035''$; $m=0.112''$; $n=0.008''$.

In FIG. 4, there are further indicated the sharp edges at E and K, and the taper $t$ which in this above embodiment is 30°. The knurl has 89 sharp teeth per inch.

Many modifications of the basic configuration as described above by way of example with reference to FIGS. 1, 2, 4 and 5 are possible. For example the flange 23 of the body 21 can be extended below the entire insert, as shown at 23.2 in FIG. 6 which is otherwise identical with the embodiment according to FIG. 5. The embodiment according to FIG. 7 illustrates devices of this type wherein an insert 31.3 extends on both sides of an insulator body 21.3. In this example an extended stem 32.5 has a head 32.6 which is rounded for the purpose for facilitating its pressurable insertion into the recess of the insulator body. The flange 23.3 is shown as extending over the knurl and anchor portions of the insert similar to the configuration according to FIG. 6. In embodiments of this type, the recess 25 of FIG. 1 extends as a perforation of uniform diameter through the entire insulating body, as indicated at 25.3 of FIG. 7.

It will be evident that the dimensions of articles according to the invention will greatly vary in accordance with their purpose, but that the proportions of the essential dimensions will be approximately similar for the various sizes. It will further be understood that the anti-rotation and anchor elements can be multiplied so long as the neck dimensions corresponding to $i$ and $k$ of FIG. 4 are ample, and so long as the sharp edges at K and E are used. It will also be understood that the cross sections of the insert and the recess of the body do not have to be circular but could be polygonal such as square or hexagonal. While flanges such as 36 of FIG. 1 are useful especially for joining wires to the solder lug 37, they are not necessary.

The method according to the present invention as applied to the assembly of the above described components of the composite article according to the invention will now be described with reference to FIGS. 8a to 8f. The embodiment according to FIGS. 1, 2 and 5 will be referred to by way of example.

By hand or by suitable conventional feeding means, the insulator body 21 is placed into the recess 55 of a confining die such as schematically shown at 54 of FIG. 8a. Such a die will consist of several segments 56, 57 which by suitable means can be held in the position according to FIG. 8a where they are sufficiently separated to define a diameter $p$ which is slightly larger than the preformed diameter $a$ of the dielectric body 21, such permit easy insertion of the body. It should be understood that FIGS. 8a to 8f are schematical; successful operated devices of this type will be described in detail hereinbelow. After the dielectric body 21 is completely seated in the opened form as shown in FIG. 8b, the form is closed as shown in FIG. 8c, to a diameter $q$ which is significantly smaller than the outside diameter $a$ of the preformed dielectric body. The pressurable closing of the die segments upon the body 21 is indicated in FIG. 8c by arrows I. In the above described practical embodiment with $a=0.094''$, the closed form diameter $q$ is $0.093''$. The squeeze to which the insulating body is subjected is in the order of magnitude of one half to to percent of the preformed outside body diameter $a$, preferably about one percent. Thus, for a larger body of say $a=0.215''$ the squeeze is about $0.003''$, to a reduced outside diameter $q=0.212''$.

In this example the dielectric body 21 is held in axial direction by the flange 23, but it will be apparent that the same function can be performed by means of a bottom or table on which the form segments slide, by means of forms having a bottom face, or by a holding device for the insert. Such alternatives will be described hereinbelow.

With the dielectric body seated and compressed according to FIG. 8c, the insert 31 is now forcibly pressed into the recess 24 of the body, as indicated at 8d by arrows II. The arrows I of FIG. 8c are also applied to FIGS. 8d and 8e to indicate that the die remains closed to dimension $q$ during these stages. Upon the insert being fully in place as shown in FIG. 8e, its segments are now separated as indicated by arrows III of FIG. 8f, again to establish the dimension $p$ as prevailing during the first stage, as indicated in FIG. 8f. The completed article can now be removed as indicated by arrows IV of FIG. 8f.

As shown in FIGS. 5, 6 and 7, sectioning of these articles will reveal that the fluorocarbon resin body completely surrounds the metal insert. This condition is important with relation to the function of the above described sharp corners of the anchor and the non-circular portion. This function has been proved by experiment and it is believed to be due to these sharp edges preventing the fluorocarbon from flowing around them upon pulling the insert from the body. As mentioned above, these edges have been found to be very important and precautious should be taken against dulling them by customary shop practices as for example by tumbling the inserts prior to assembly.

Upon being released from the dimension $q$ of the closed die, the dielectric body might expand to a slight degree, but it was found that very little if any deformation of the outer cylindrical surface of the dielectric body takes place, not even after considerable time during which the fluorocarbon body due to its memory might tend to change its form.

No specific setting times beyond those required for the optimally speedy mechanical performance of the die are required for either one of the steps outlined with reference to FIGS. 8a to 8f and the whole process takes place at normal ambient temperature. Heat transfer is not required during any one of the stages of the process and heating or cooling of any of the die components is not provided, the dielectric material remaining throughout in solid state regardless of temperature conditions. In other words, the present process has nothing in common with techniques for molding thermoplastic or thermosetting synthetic resins. Such techniques are irrelevant for present purposes due to the very nature of the resins herein dealt with. It should be understood that normal ambient temperature as above referred to means any temperature at which the polyethylenes in question behave as solids with regard to their electrical and mechanical properties. For example in the case of polytetrafluoroethylene, this solid state would prevail at normal ambient temperatures up to about 600° F. and under certain conditions even higher. The terms "solid state" and "normal ambient temperature" as herein used are to be understood in that sense.

It will be evident that the present technique is not restricted to metal inserts but lends itself to the firm assembly of any sufficiently rigid central component with a surrounding body having the properties of polyethylenes, especially fluorocarbon resins in solid state, as above defined.

In order to take full advantage of the present invention, its principal concepts are preferably combined, namely compression or at least confinement during pressurable assembly of the body with the insert, certain shapes including sharp edges at certain regions to resist separation, and certain preformed dimensions, all of these assuring complete internal locking contact of insert and dielectric body. However the confinement during assembly does not have to be pressurable if the locking requirements are less exacting.

While the present technique is mainly used with fluorocarbonethylene and chlorofluorocarbonethylene compounds because of their superior qualities, it should be understood that it is also applicable to hydrocarbonethylenes which present similar fabricating problems.

With reference to FIGS. 9 to 14 two embodiments of machinery for carrying out the process according to the invention will now be described.

Figure 10:
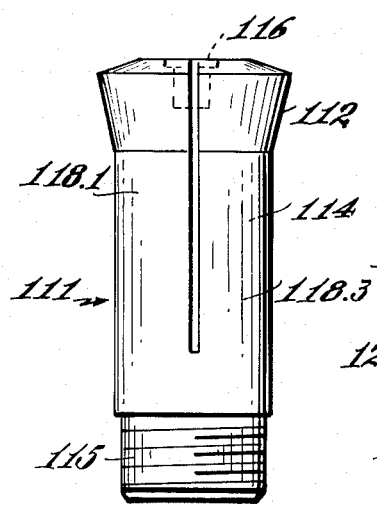
Figure 11:
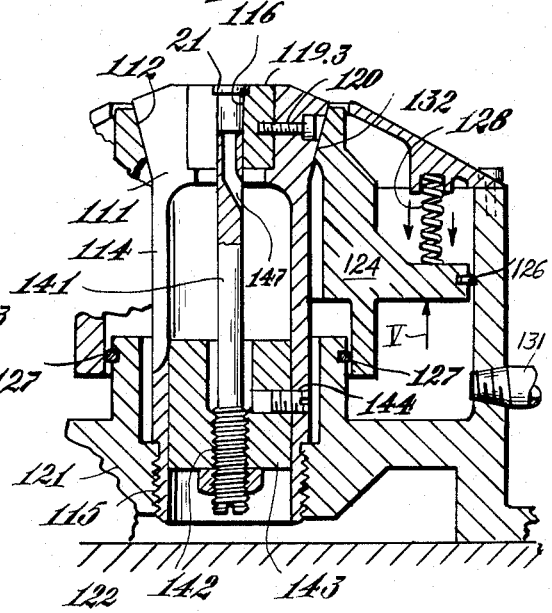
FIG. 11 is an axial section of apparatus for actuating dies such as according to FIGS. 9 and 10 for purposes of the invention.

In FIGS. 9 to 11 a molding form sleeve is indicated at 111. It has a conical portion 112 and a cylindrical shank 114 with a threaded end 115. The form has three sectors 118.1, 118.2, 118.3 separated by slits 118.5, 118.6, 118.7. These slits form elastic jaws permitting contraction of the coining cavity 116 formed by three inserts 119.1, 119.2 and 119.3, fastened with set screws 120, which inserts are likewise separated by slits as indicated at 119.5, 119.6 and 119.7. The sleeve 111 is with its shank 114 fastened at 115 to the base 121 of a conventional hydraulic actuating device which is bolted to a table 122 and contains slidingly guided therein a barrel component 124. The sliding barrel is provided by a piston ring 126 and an O-ring 127 or similar sealing means. Compressed air supplied at 131 will lift the piston assembly against the force of return springs indicated at 128. The barrel 124 has a conical recess 132 which corresponds to the taper 112 of the molding sleeve 111. The springs 128 normally retract the barrel 124 and permit the coining form proper to assume the opened position shown in FIGS. 9 and 10. Upon raising the piston portion 124 in the direction of arrow V the two tapered faces 112 and 132 will force the jaws of the form together, closing the gaps 119.5, 119.6 and 119.7. It will be evident that the normal, relaxed position of sleeve 114 defines the open dimension $p$ of FIGS. 8a, 8b and 8f, and that the exactly machined faces of the inserts 119 define the closed dimension $q$ of FIGS. 8c, 8d, and 8e.

The inserts 119 are interchangeable for fabricating different sizes and shapes of composite articles. The bottom of the die 116 is formed by a rod 141 secured at 142 to a block 143 which is fastened to the shank 114 by a set screw 144. The rod 141 can thus be easily adjusted, and exchanged, to accommodate various sizes of die inserts and dielectric bodies. The rod has an axial bore with an opening 147 which accommodates insert components such as 32.5 of FIG. 7 that extend on both sides of the insulating body 21.3, and permits small particles of the insulating body which might become detached, to fall through the opening 147 into the hollow portion of the shank 114 from which they can be removed through a suitable opening.

Figure 12:
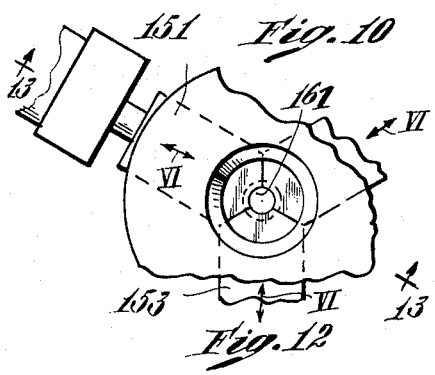
FIGS. 12 and 13 are top elevation and axial section respectively of another embodiment of machinery for carrying out the method according to the invention.
Figure 13:
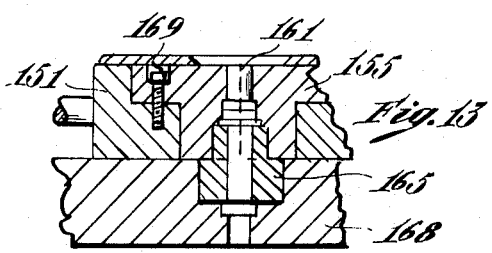

For shapes which require the opening of the die components beyond the $p$ dimension such as for example insulators with flanges on the side opposite to that through which the insert is pressed into the insulator body, machinery similar to that schematically indicated in FIGS. 12 and 13 is used. In this modification three jaws 151, 152 and 153 are movable along axes forming 120° angles and, when closed, constituting dies defining shapes such as shown at 161 of FIGS. 12 and 13. Interchangeable die inserts such as indicated at 155 of FIG. 13, with appropriate gaps shown closed in FIG. 12, are again provided, and a body 165 defines the bottom of the die. The operation is quite similar to that described with reference to FIGS. 8a to 8f, and 9 to 11. It will be evident that the die segments have to retract sufficiently to clear the flange of the insulating body upon insertion and removal thereof.

For both opening and closing the jaws in the direction of arrows VI, hydraulic devices similar to those described above with reference to FIG. 11 are provided, and it will be understood that these three jaws move between devices such as a table 168 and a holding plate 169 as indicated in FIG. 13.

Figure 14:
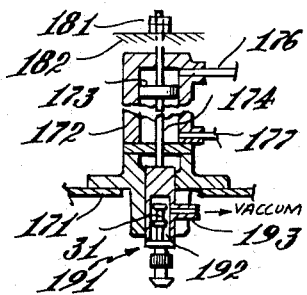
FIG. 14 is an axial section similar to FIG. 11, approximately in the same scale, of an inserting device for cooperation with apparatus according to FIGS. 11, 12 and 13.

For pressurably inserting the metallic insert into the dielectric body, a device such as schematically indicated in FIG. 14 can be used with assembling apparatus according to FIGS. 9 to 13. In FIG. 14 numeral 171 indicates a support which will be rigidly connected to the support 122 of FIG. 11 or 168 of FIG. 13. Mounted thereon is the cylinder 172 of a conventional pneumatic device with a piston 173, a rod 174 and air ports 176, 177. The piston rod 174 carries at one end a stop nut arrangement 181 capable of bearing against a face 182 which is fixed relatively to 171 and 122 or 168, thus adjustably limiting the downward movement of the inserting device. At its other end the rod 174 carries a pneumatic device 191 with a cavity 192 and a vacuum duct 193, for holding an insert such as indicated at 31 of FIG. 14. It will be evident that a metallic insert can be fed to and held in the vacuum device 191 and thereupon forcibly pressed into the dielectric body such as 21 indicated in FIG. 11, with the die in position according to FIG. 8d. By pneumatically lifting the holder 191, the finished article can be raised from the die as indicated in FIG. 8f, after the die segments have been separated from the $q$ dimension to the $p$ dimension.

The assembly technique as above described is similar for various embodiments of the general nature herein set forth, such as exemplified by FIGS. 5, 6 and 7, and it should be understood that the compression to dimension $q$ of FIGS. 8a to 8f extends over the entire region of the rotation preventing portion or portions such as knurl 33 and anchor portion or portions 35 thus, in embodiments analogous to FIG. 6, including the entire flange portion 23.2. Pressurable assembly while the dielectric body is compressed is important for best results meeting all torque resistance, axial pull-out and lateral pull-out requirements, probably due to a permanent disruption of polymer molecules which cannot evade the material displacing and possibly cutting effect of the insert as it is pressed into the pressurably confined body. It was also found that this procedure preserves the original outside shape and dimension of the body essentially undistorted, and that it cooperates effectively for permanent and firm contact of body and insert, with the sharp knurl and anchor edges, with an unusually fine and sharp knurl such as the above described 80 knurls per inch instead of the usual 60 knurls per inch, and with preformed dimensions providing complete contact of body and insert upon assembly.

It should be understood that the present disclosure is for the purpose of illustration only and that this invention includes all modifications and equivalents which fall within the scope of the appended claims.

We claim:

1. A method of fabricating an article composed of a dielectric body having a free outer surface and an axial recess, and being preformed to a predetermined outside diameter of a material having the physical characteristics of polyfluoroethylene in solid state, and of a rigid insert having on a stem non-circular and anchor portions, comprising the steps of:

compressing said body at said outer surface in solid state to an outside diameter significantly smaller than said preformed outside diameter of the body;
pressing the insert into said recess of the body while the body remains compressed in said solid state to said smaller diameter, being thus held against distortion of said compressed outer surface during the entire time of fabrication; and
releasing said body after completion of the placement of said insert to regain said free outer surface;
whereby the body material flows into the spaces at and between non-circular and anchor portions, and the outside of the body retains said outside diameter essentially undistorted.

2. Method according to claim 1, further comprising the steps of:
preforming said insert with at least one of said portions having a taper with a sharp edge forming an anchor; and
orienting the insert for pressing into the recess such that said portion leads said edge;
whereby the sharp edges trap the body material to resist pulling of the insert from the body in the direction opposite to that of insertion.

3. Method according to claim 2 further including the steps of:
preforming the edge diameter of said anchor portion appreciably greater than said recess, and
of preforming the outer diameter of said non-circular portion slightly greater than said edge diameter;
whereby complete contact between insulating body and insert is enhanced.

4. Method according to claim 2, wherein
the stem portion next to said sharp edge of the anchor portion is preformed to be longer than said anchor portion;
whereby retention of the body material ahead of the anchor portion is enhanced.

5. Method according to claim 2 wherein
said stem is preformed to a diameter slightly smaller than said recess;
whereby complete contact between insulating body and insert is enhanced.

6. Method according to claim 1 further comprising the step of
preforming said body recess and said insert with dimensions such that body material which is displaced during the pressing of the insert into the recess essentially completely fills the contour of the insert.

7. A method of fabricating an article composed of a dielectric body of a material having the physical characteristics of polyfluoroethylenes in solid state, and having a free outer surface and of a conductive insert, comprising the steps of:
preforming the body with a cylindrical outside of given diameter, and an essentially continuous cylindrical recess of given diameter;
preforming the insert with a stem with at least one circular anchor portion extending from the stem and having a taper forming a sharp edge and with at least one non-circularly enlarged portion extending from the stem adjacent to said edge of the anchor portion and having a sharp edge on the end removed from said anchor portion, the diameter of the stem being slightly smaller than the diameter of said body recess, the outside diameter of said anchor portion being appreciably greater than said recess diameter, and said non-circular portion having an extreme diameter slightly greater than said recess diameter;
compressing said body at said outside in solid state to an outside diameter about one half to two percent smaller than said preformed outside diameter of the body; and
pressing said insert, with said taper leading, into said recess of the body while the body is compressed in said solid state, to said smaller diameter, being thus restrained against distortion of said compressed outside during the entire time of fabrication until the recess is essentially filled by said stem and said anchor and non-circular portions; and
releasing said body after completion of the placement of said insert to regain said free outer surface;
whereby the body material flows into the spaces at and between anchor and non-circular portions, the outside of the body retains said outside diameter essentially undistorted, and the sharp edges trap the body material to resist pulling of the insert from the body in the direction opposite to that of insertion.

8. A composite article comprising:
a dielectric body made of a material having the physical characteristics of polyfluoroethylenes, having a preformed completely unobstructed free outer surface and having a cylindrical axial recess; and
a rigid insert having within said body a stem, at least one anchor portion extending from the stem with a sharply edged taper peripherally terminating in a sharp edge with oblique edge angle, and at least one non-circular stem deformation, said body material filling the spaces at and between said anchor portion and said stem deformation;
whereby said free outer surface of the body remains essentially undistorted, and the sharp edge traps the body material to resist pulling of the insert from the body in the direction opposite to the taper.

9. Article according to claim 8 wherein said stem deformation has a sharp circumferential edge.

10. A composite article comprising:
a dielectric body made of a material having the physical characteristics of polyfluoroethylenes, and having a preformed completely unobstructed free outer surface and a preformed recess within said surface; and
a conductive insert having within said body a stem, at least one anchor portion extending from the stem with a sharply edged taper, and at least one non-circular stem deformation;
the said material of the body filling the spaces at and between said anchor portion and said stem deformation to a substantially complete degree defined by said body and said insert being assembled by first compressing the body and by then pressing the insert, with said taper leading, into said recess of the body while the body is compressed for restraint against distortion of said free outer surface during the entire time of assembly, and released thereafter;
whereby the outside of the body remains essentially undistorted, and the sharp edge traps the body material to resist pulling of the insert from the body in the direction opposite to that of insertion.

11. A lead through insulator comprising:
a dielectric body having a cylindrical outside and a cylindrical axial recess, and preformed with a free outer surface from a material having the physical characteristics of polyfluoroethylenes; and
a conductive insert having a stem with a terminal portion outside of said body and having within said recess of the body an enclosed portion of said stem, at least one circular anchor portion extending from the enclosed stem portion with a sharply edged taper, and at least one axially knurled portion extending from the enclosed stem portion between said terminal portion and said anchor portion and being sharply edged at the end remote from said anchor portion, the stem portion between said anchor portion and said knurled portion being longer than the anchor portion;
the said material of the body filling the spaces at and between anchor and knurl portions to a substantially complete degree defined by said body and said insert being assembled by first compressing the body to an outside diameter about one half to two percent smaller than the preformed outside diameter of the body and by then pressing the insert, with said taper leading, into a recess of the body while the body is compressed for restraint against distortion of said free outer surface during the entire time of assembly, and released thereafter;

whereby the outside of the body remains essentially undistorted and the sharp edges of anchor and knurled portion trap the body material to resist pulling of the insert from the body in the direction opposite to that of insertion.

References Cited by the Examiner

UNITED STATES PATENTS

| | | | |
|---|---|---|---|
| 2,433,911 | 1/1948 | Johnston | 174—153 X |
| 2,774,812 | 12/1956 | Clark | 174—153 |
| 2,785,219 | 3/1957 | Rudner | 174—166 |
| 2,911,460 | 11/1959 | Oxley | 174—153 |
| 2,918,521 | 12/1959 | Abrams | 174—166 X |
| 3,189,672 | 6/1965 | Lyman | 174—152 X |

OTHER REFERENCES

"Teflon Insulated Electronic Components," Bulletin No. ERD 101A, Erie Resistor Corp., Erie, Pennsylvania, pages 5 and 7.

LARAMIE E. ASKIN, *Primary Examiner.*

JOHN P. WILDMAN, JOHN F. BURNS, *Examiners.*